UNITED STATES PATENT OFFICE.

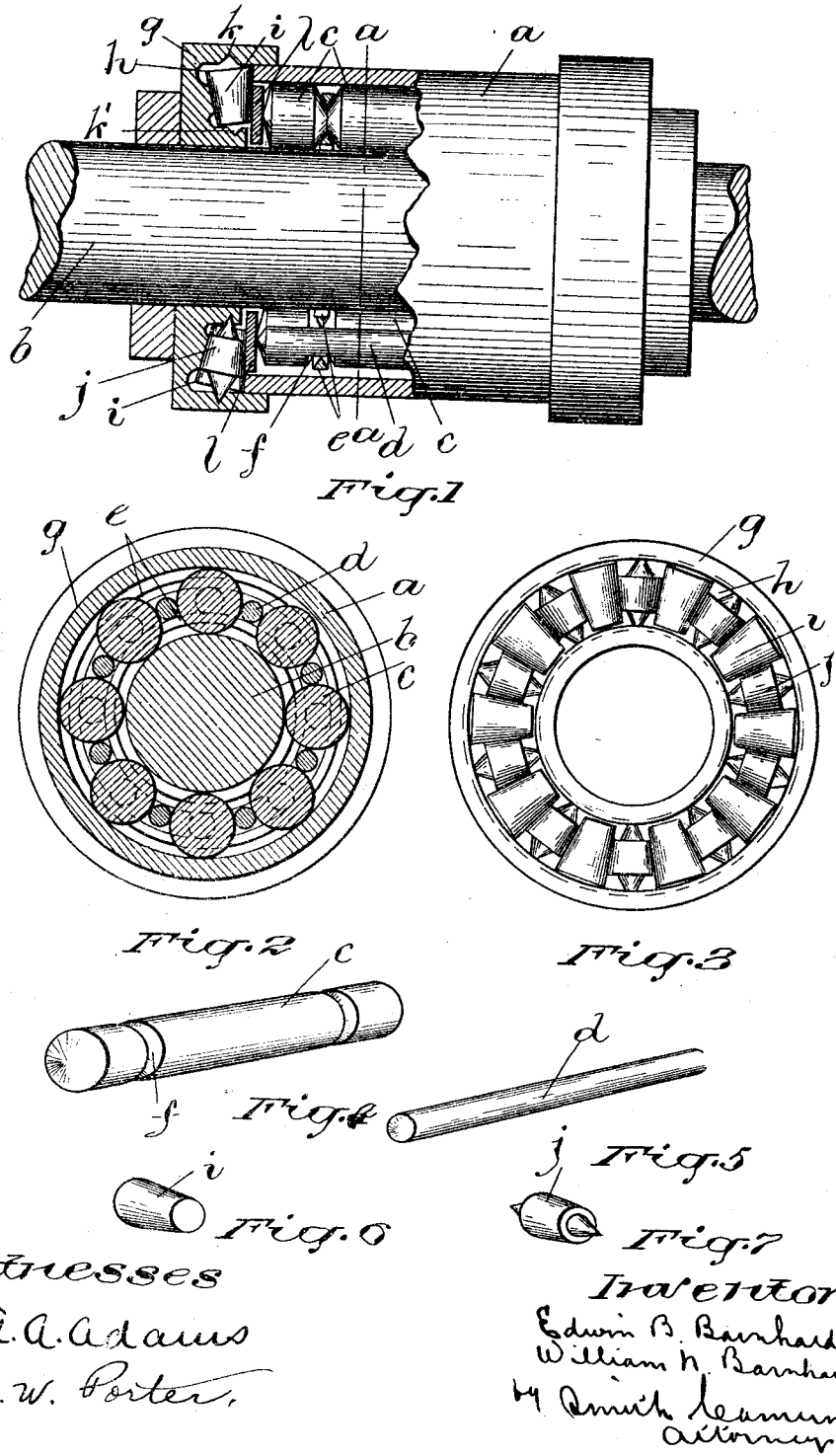

EDWIN BRUCE BARNHARDT, OF ORANGEVILLE, ONTARIO, CANADA, AND WILLIAM NEWTON BARNHARDT, OF CENTRAL ISLIP, NEW YORK.

ROLLER-BEARING.

1,156,516.  Specification of Letters Patent.  Patented Oct. 12, 1915.

Application filed December 18, 1913. Serial No. 807,500.

*To all whom it may concern:*

Be it known that we, EDWIN BRUCE BARNHARDT, a subject of the King of Great Britain, residing at Orangeville, in the county of Dufferin, Province of Ontario, Canada, farmer, and WILLIAM NEWTON BARNHARDT, a citizen of the United States of America, residing at Central Islip, Long Island, in the State of New York, medical doctor, have jointly invented a new and useful Improvement in Roller-Bearings, of which the following is a specification.

Our invention relates to a bearing provided with anti-frictional bearing and end thrust rollers arranged in combination.

Our device is constructed in which we arrange a series of bearing rollers of two different diameters in parallel relation around the rotary shaft with end thrust rollers arranged at right angles with the axial direction of the bearing rollers.

Our object is to eliminate as far as possible end thrust friction by the bearing rollers, and to obviate it, we introduce the end thrust rollers adapted to revolve in radial direction around the rotary shaft at each end of the bearing rollers. Between the end thrust rollers and the ends of the bearing rollers we introduce a contact plate adapted to loosely revolve in the direction with the travel of the shaft so that by the engagement of the ends of the bearing rollers against the contact plate, the friction is reduced by the motion of the end thrust rollers traveling in unison with the contact plate.

We surround the bearing rollers with a suitable sleeve, which comprises the bearing, adapted to set in a hanger or pillow block. The end thrust rollers we arrange in radial relation in circumferential channels formed in end caps adapted to engage over the ends of the sleeve or bearing. Surrounding the bearing rollers is a suitable sleeve which comprises the bearing, and the end thrust rollers are set in a circumferential channel formed in suitable end caps adapted to engage over the ends of the bearing.

The drawings illustrate our invention; Figure 1 is a side elevational view of the bearing partially in section; Fig. 2 is a sectional view on lines *a—a* Fig. 1; Fig. 3 is a sectional view of the end cap showing the end thrust rollers; Fig. 4 is a perspective view of one of the bearing rollers; Fig. 5 is a perspective view of the spacing rollers; Fig. 6 is a perspective view of one of the end thrust rollers; and, Fig. 7 is a perspective view of the end thrust spacer.

Like letters of reference refer to like parts throughout the drawings and specification.

*a* designates the bearing which consists preferably of a cylindrical sleeve adapted to be set in a hanger or pillow block.

*b* designates a shaft extending centrally longitudinally through the bearing.

*c* designates bearing rollers adapted to extend in longitudinal relation with the shaft *b* and engage in frictional contact between the internal surface of the bearing *a* and the shaft *b*. The bearing rollers *c* are interposed alternatively by spacer rollers *d*, and are maintained in a proper relative position with the bearing rollers *c* by binding rings *e*.

The binding rings *e* are arranged in pairs and are preferably V shaped in cross section, and are adapted to engage in V shaped channels *f* formed around the bearing rollers *c*. The binding rings engage in the channels *f* in the bearing rollers in concentric relation, so that the spacer rollers will be properly centered and maintained in their proper relation with the bearing rollers. Engaging over the ends of the bearing *a* are end caps *g* formed with an annular channel *h*.

Set in the annular channel *h* in radial relation, are a series of tapered end thrust rollers *i*. Interposed between each of the end thrust rollers *i* are spacer rollers *j* for the purpose of maintaining the rollers *i* separated. Formed integrally on the ends of the spacer rollers *j* are conical shaped pintles. The pintles engage in circumferential grooves *k* and *k'* formed in the inner and outer side walls of the channel *h* and engage in frictional contact between the end thrust rollers *i*, and revolve in opposite directions from that of the rollers *i*, the pintles acting as pivots on which the spacer rollers revolve. The spacer rollers will be preferably of a lesser circumference than that of the end thrust rollers *i*.

Interposed between the end thrust rollers *i* and the conical shaped ends of the bearing rollers *c* is a contact plate *l*. The contact plate *l* freely engages against the end thrust rollers *i* providing a flush face for the bearing rollers c to engage against laterally and prevents them from binding or becoming misplaced laterally, which would be the result if they engaged directly in contact against the end thrust rollers i by the irregularity of the rollers being of two different diameters.

What we claim as new and desire to secure by Letters Patent is:

1. In a roller bearing, the combination with a shaft and bearing case, a series of bearing rollers arranged in longitudinal relation internally of the bearing case, end caps engaging over the ends of the said bearing case, channels formed in the said end caps, tapered radial rollers arranged in radial relation in the said channels, spacer rollers interposed between the said tapered radial rollers, a contact plate loosely engaging against the said radial rollers, the said contact plate adapted to engage against the conical shaped ends of the said bearing rollers, substantially as described.

2. In a roller bearing, the combination with a shaft and bearing case, of a series of bearing rollers arranged in longitudinal relation therewith, said bearing rollers interposed by spacer rollers of a lesser diameter, binding rings adapted to maintain the said spacer rollers in their relative position with said bearing rollers, the ends of said bearing rollers being conical shaped, end caps engaging over the ends of the said bearing case, tapered radial rollers arranged in radial relation at an angle with the said bearing rollers, a contact plate interposed between the ends of the said bearing rollers and against the said radial rollers, substantially as described.

3. In a roller bearing, the combination with a shaft and bearing case, of a series of spaced bearing rollers arranged longitudinally therewith, of end caps engaging over the ends of the said bearing case, of a circular channel formed in the adjacent face of the said end caps, tapered radial rollers arranged in radial relation in the said channels, spacer rollers adapted to turn on pintle ends interposed between each of the said radial rollers, a contact plate interposed and engaging between the conical ends of the bearing rollers and the tapered radial rollers and adapted to turn in unison, substantially as described.

4. In a roller bearing, the combination with a shaft and bearing case, of a series of bearing rollers arranged in longitudinal direction internally therewith, spacing rollers arranged between the said bearing rollers, grooves formed in the ends of said bearing rollers, binding rings surrounding the said binding and spacing rollers, said binding rings engaging in the said grooves, a series of radial rollers arranged radially at an angle with the said bearing rollers, spacing rollers engaging between the said radial rollers, the said radial and spacing rollers adapted to travel in radial rotation in a circular channel formed in the adjacent face of the end caps, said end caps adapted to engage over the ends of the said bearing case, a contact plate interposed between the ends of said bearing rollers and the said radial rollers, substantially as described.

Signed at Toronto, in the county of York, this 20th day of November, 1913, in the presence of two witnesses.

E. B. BARNHARDT.

Witnesses:
J. W. PORTER,
A. A. ADAMS.

Signed at Central Islip, in the county of Suffolk, State of New York, this 13th day of November, 1913, in the presence of two witnesses.

W. N. BARNHARDT.

Witnesses:
MICHAEL F. DEE,
MATTHEW D. DAVISON.